United States Patent [19]

Itabashi

[11] Patent Number: 5,221,986
[45] Date of Patent: Jun. 22, 1993

[54] SCANNING IMAGE-FORMING LENS SYSTEM AND OPTICAL SCANNER

[75] Inventor: Akihisa Itabashi, Mitaka, Japan

[73] Assignee: Ricoh Company, Ltd., Tokyo, Japan

[21] Appl. No.: 890,008

[22] Filed: May 29, 1992

[30] Foreign Application Priority Data

Jul. 2, 1991 [JP] Japan .................. 3-161718

[51] Int. Cl.⁵ ............................. G02B 26/08
[52] U.S. Cl. .................... 359/206; 359/218
[58] Field of Search ........... 359/205, 206, 216, 217, 359/218, 219, 207; 250/235, 236

[56] References Cited

U.S. PATENT DOCUMENTS

| | | | |
|---|---|---|---|
| 4,859,011 | 8/1989 | Takahashi | 359/207 |
| 5,015,050 | 5/1991 | Itabashi | 359/206 |
| 5,029,956 | 7/1991 | Takahashi et al. | 359/205 |
| 5,031,979 | 7/1991 | Itabashi | 359/206 |
| 5,062,679 | 11/1991 | Itabashi | 359/206 |
| 5,064,261 | 11/1991 | Itabashi | 359/206 |

FOREIGN PATENT DOCUMENTS 1-92717 4/1989 Japan .

Primary Examiner—Loha Ben
Attorney, Agent, or Firm—Oblon, Spivak, McClelland, Maier & Neustadt

[57] ABSTRACT

A scanning image-forming lens system is constructed by two lens groups composed of first and second lenses sequentially arranged from the side of a rotary polygon mirror to the side of a scanned face and having toric faces. The scanning image-forming lens system has a function for approximately providing a conjugate relation in geometrical optics between positions of the scanned face and a deflecting reflecting face of the rotary polygon mirror with respect to a cross scan-corresponding direction, and has and fθ function with respect to a main scan-corresponding direction. The first and second lenses are arranged such that the first and second lenses are respectively shifted from a reference optical axis by distances $\Delta_1$ and $\Delta_2$ in the main scan-corresponding direction. The distances $\Delta_1$ and $\Delta_2$, and focal lengths $f_1$ and $f_2$ of the first and second lenses with respect to the main scan-corresponding direction satisfy the following conditions:

$$0.0001 < |\Delta_1/f_1| < 0.005 \qquad (I)$$

$$0.0072 < |\Delta_2/f_2| < 0.013 \qquad (II)$$

2 Claims, 7 Drawing Sheets

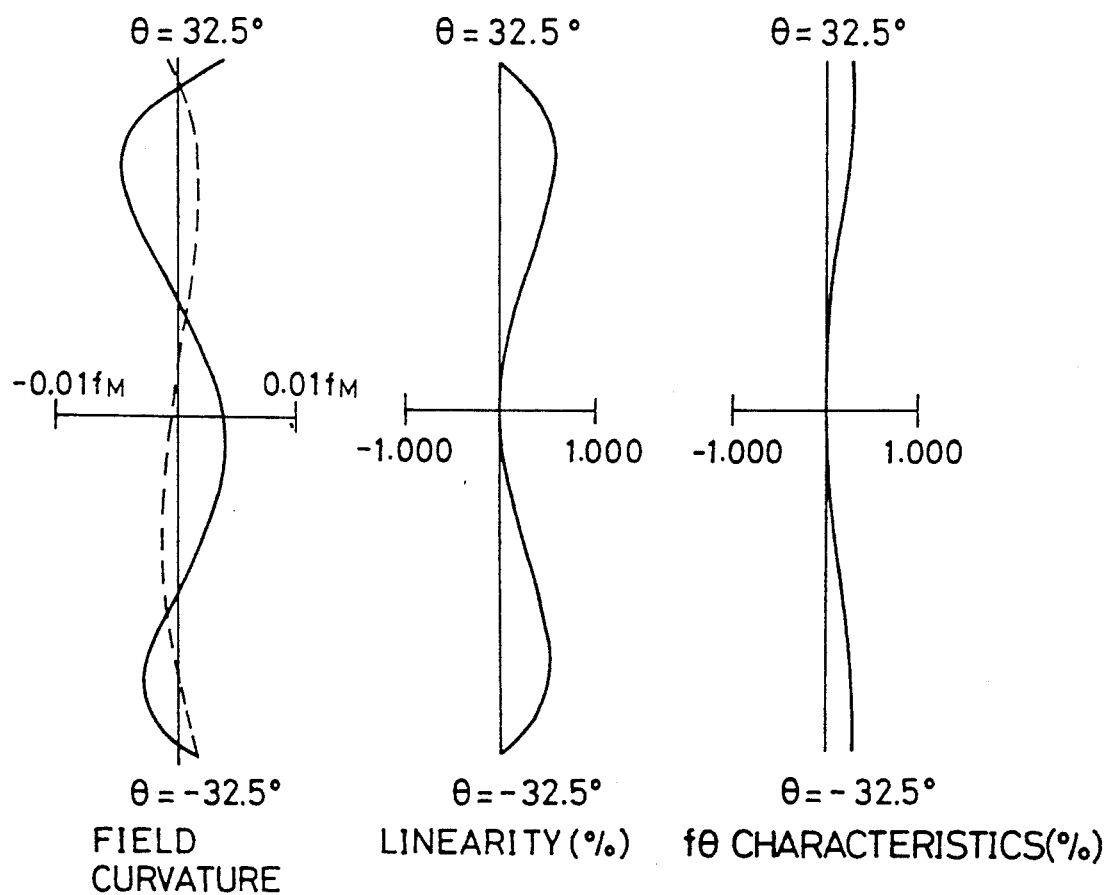

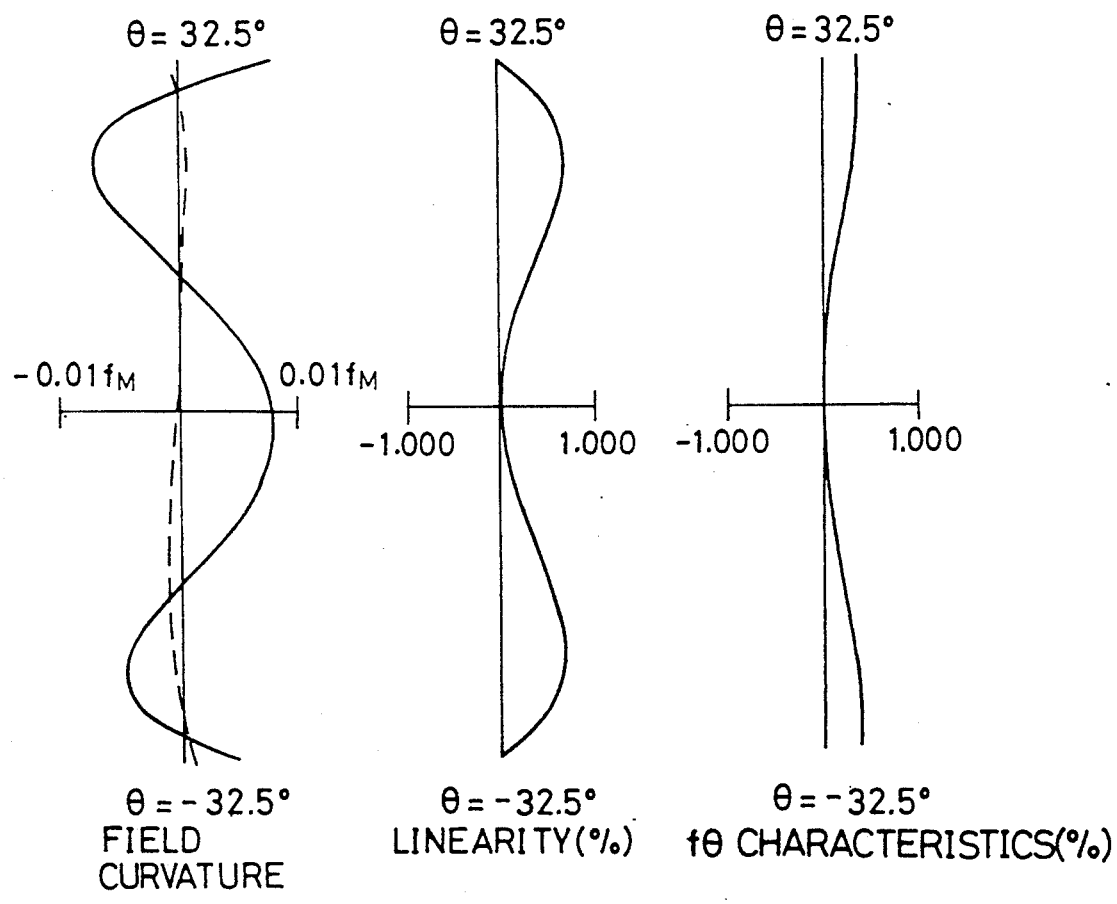

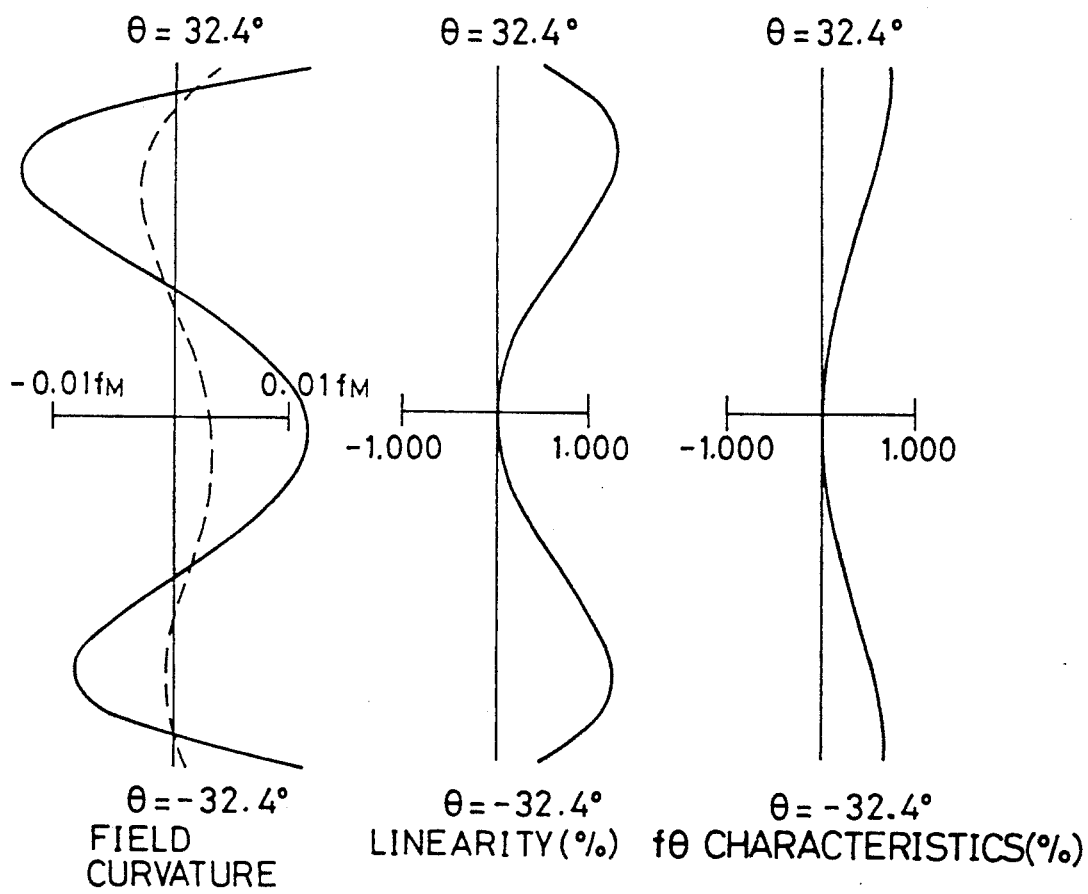

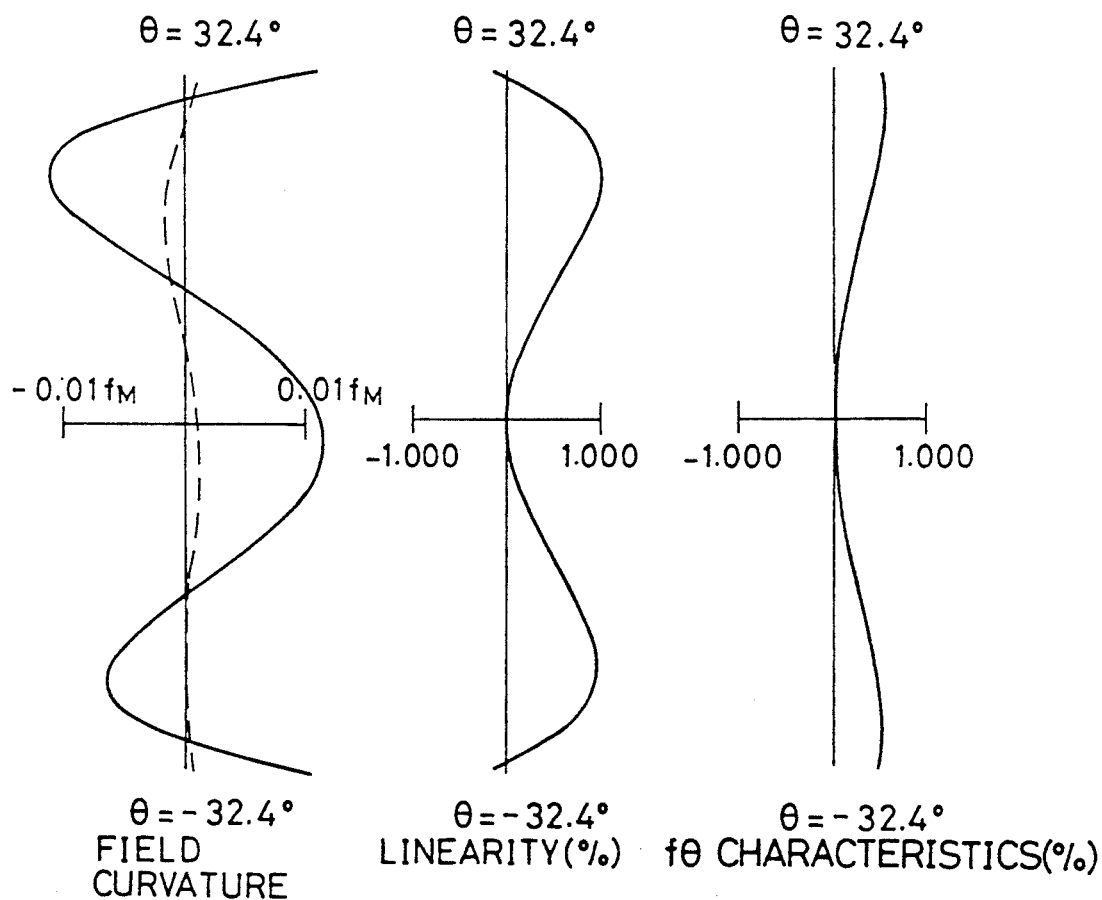

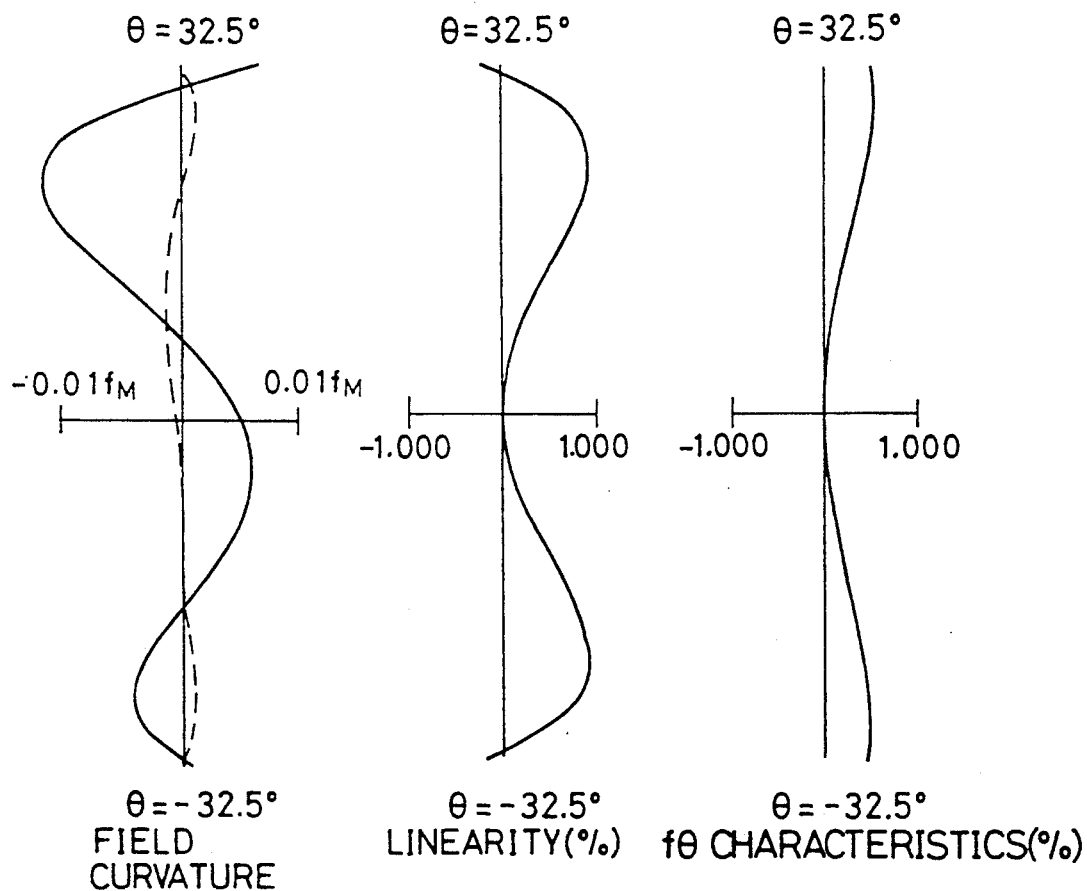

SCANNING IMAGE-FORMING LENS SYSTEM AND OPTICAL SCANNER

BACKGROUND OF THE INVENTION

1. Field of the Invention

The present invention relates to a scanning image-forming lens system using a rotary polygon mirror and an optical scanner using the scanning image-forming lens system.

2. Description of the Related Art

An optical scanner is well known in relation to a laser printer, a digital copying machine, etc. Recently, a high optical scanning performance has been required and there is a problem about stability of the diameter of a light spot formed on a scanned face. When the diameter of the light spot is changed in accordance with a change in scanning position of the light spot, a dot diameter of the optical scanner is changed. This change in dot diameter greatly prevents an optical scanning operation from being performed with high performance.

As is well known, the diameter of the light spot is changed by the field curvature of a scanning image-forming lens system for forming the light spot on the scanned face. In general, one of developing targets for the scanning image-forming lens system is to reduce the field curvature thereof as much as possible.

There is a problem about a so-called reflecting face inclination in a rotary polygon mirror widely used as a means for deflecting a light beam in the optical scanner. To remove an influence of this reflecting face inclination, a light beam incident to the rotary polygon mirror is focused and formed as a linear image extending in a main scan-corresponding direction in the vicinity of a deflecting reflecting face of the rotary polygon mirror. Positions of the deflecting reflecting face and the scanned face are generally set by the scanning image-forming lens system in a conjugate relation in geometrical optics with respect to a cross scan-corresponding direction.

In such a case, a forming position of the above linear image and the position of the deflecting reflecting face are slightly shifted two-dimensionally in accordance with rotation of the rotary polygon mirror. Accordingly, no field curvature of the scanning image-forming lens system is symmetrically caused on the positive and negative sides of an angle of deflection of a deflected light beam. Therefore, it is complicated to correct the field curvature of the scanning image-forming lens system.

Japanese Patent Application Laying Open (KOKAI) No. 1-92717 shows a method for correcting such field curvature in consideration of asymmetry thereof. In this method, a scanning image-forming lens system is designed such that the entire lens system is shifted from a reference optical axis in a main scan-corresponding direction and a shifted position of this lens system is set to a reference position.

This method is a field curvature correcting method utilizing a nature in which the field curvature is rotationally changed by the above shift in position of the scanning image-forming lens system. This method is effective to correct one of field curvatures in the main and cross scan-corresponding directions. However, it is impossible to simultaneously and independently correct both the field curvatures in the main and cross scan-corresponding directions.

SUMMARY OF THE INVENTION

It is therefore an object of the present invention to provide a scanning image-forming lens system for simultaneously and independently correcting field curvatures in main and cross scan-corresponding directions, and provide an optical scanner using this scanning image-forming lens system in an optical scanning system using a rotary polygon mirror as a means for deflecting a light beam and correcting the inclination of a reflecting face.

In accordance with a first structure of the present invention, the above object can be achieved by a scanning image-forming lens system used in an optical scanner in which a light beam emitted from a light source device is focused and formed as a linear image extending in a main scan-corresponding direction; the light beam is deflected at an equal angular velocity by a rotary polygon mirror having a deflecting reflecting face in the vicinity of a forming position of the linear image; the deflected light beam is converged toward a scanned face by an image-forming optical system to form a light spot on the scanned face; and the scanned face is optically scanned by this light spot. The scanning image-forming lens system is constructed by two lens groups composed of first and second lenses sequentially arranged from a side of the rotary polygon mirror to a side of the scanned face and having toric faces. The scanning image-forming lens system has a function for approximately providing a conjugate relation in geometrical optics between positions of the deflecting reflecting face and the scanned face with respect to a cross scan-corresponding direction, and has an $f\theta$ function with respect to the main scan-corresponding direction. The first and second lenses are arranged such that the first and second lenses are respectively shifted from a reference optical axis by distances $\Delta_1$ and $\Delta_2$ in the main scan-corresponding direction. The distances $\Delta_1$ and $\Delta_2$, and focal lengths $f_1$ and $f_2$ of the first and second lenses with respect to the main scan-corresponding direction satisfy the following conditions:

$$0.0001 < |\Delta_1/f_1| < 0.005 \qquad (I)$$

$$0.0072 < |\Delta_2/f_2| < 0.013 \qquad (II)$$

In accordance with a second structure of the present invention, the above object can be achieved by an optical scanner comprising a light source device; a linear image-forming optical system for focusing and forming a light beam emitted from the light source device as a linear image extending in a main scan-corresponding direction; a rotary polygon mirror having a deflecting reflecting face in the vicinity of a forming position of the linear image and deflecting a reflected light beam at an equal angular velocity; and an image-forming optical system for converging the deflected light beam from the rotary polygon mirror to a scanned face so as to form a light spot on the scanned face. The image-forming optical system is constructed by a scanning image-forming lens system. This scanning image-forming lens system is constructed by two lens groups composed of first and second lenses sequentially arranged from a side of the rotary polygon mirror to a side of the scanned face and having toric faces. The scanning image-forming lens system has a function for approximately providing a conjugate relation in geometrical optics between positions of the deflecting reflecting face and the scanned face with respect to a cross scan-corresponding direction, and has an fθ function with respect to the main scan-corresponding direction. The first and second lenses are arranged such that the first and second lenses are respectively shifted from a reference optical axis by distances $\Delta_1$ and $\Delta_2$ in the main scan-corresponding direction. The distances $\Delta_1$ and $\Delta_2$, and focal lengths $f_1$ and $f_2$ of the first and second lenses with respect to the main scan-corresponding direction satisfy the following conditions:

$$0.0001 < |\Delta_1/f_1| < 0.005 \quad (I)$$

$$0.0072 < |\Delta_2/f_2| < 0.013 \quad (II)$$

In the above scanning image-forming lens system, field curvatures in the main and cross scan-corresponding directions can be corrected simultaneously and independently in an optical scanning system using the rotary polygon mirror as a means for deflecting a light beam and correcting the inclination of a reflecting face. These field curvatures can be also corrected simultaneously and independently in the optical scanner using this scanning image-forming lens system.

Further objects and advantages of the present invention will be apparent from the following description of the preferred embodiments of the present invention as illustrated in the accompanying drawings.

BRIEF DESCRIPTION OF THE DRAWINGS

FIGS. 2a to 2c are diagrams respectively showing field curvature, linearity and fθ characteristics of a scanning image-forming lens system with respect to Embodiment 1;

FIGS. 3a to 3c are diagrams respectively showing field curvature, linearity and fθ characteristics of the scanning image-forming lens system with respect to Embodiment 2;

FIGS. 4a to 4c are diagrams respectively showing field curvature, linearity and fθ characteristics of the scanning image-forming lens system with respect to Embodiment 3;

FIGS. 5a to 5c are diagrams respectively showing field curvature, linearity and fθ characteristics of the scanning image-forming lens system with respect to Embodiment 4;

FIGS. 6a to 6c are diagrams respectively showing field curvature, linearity and fθ characteristics of the scanning image-forming lens system with respect to Embodiment 5;

DESCRIPTION OF THE PREFERRED EMBODIMENTS

Figure 1A:
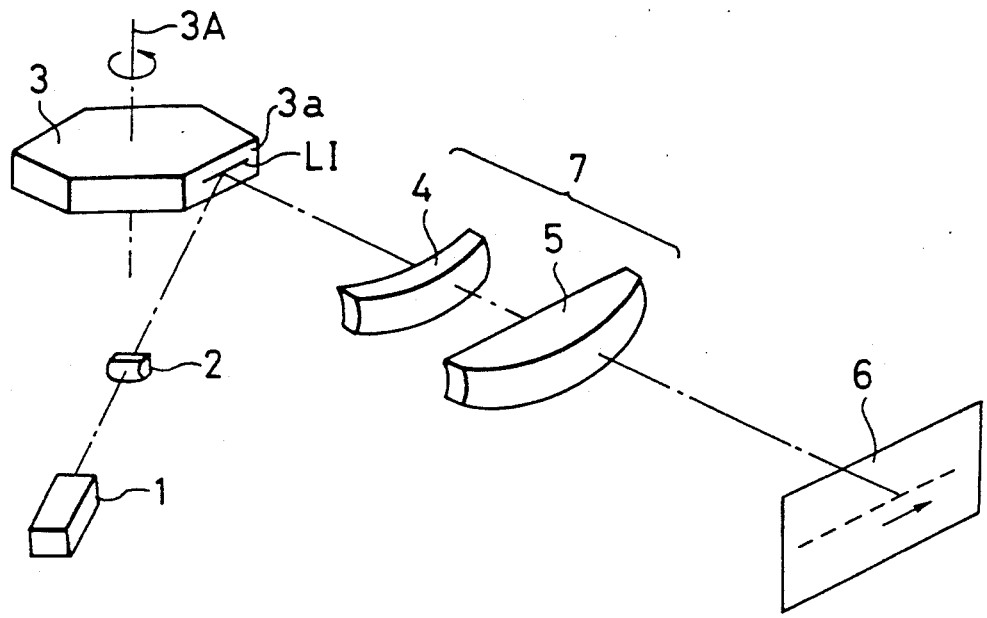
FIG. 1a is a perspective view showing one example of an optical scanner to which the present invention is applied.

The preferred embodiments of a scanning image-forming lens system and an optical scanner in the present invention will next be described in detail with reference to the accompanying drawings.

A scanning image-forming lens system in accordance with a first structure of the present invention is constructed by an image-forming optical system used in an optical scanner. In this optical scanner, a light beam emitted from a light source device is focused and formed as a linear image extending in a main scan-corresponding direction. The light beam is deflected at an equal angular velocity by a rotary polygon mirror having a deflecting reflecting face in the vicinity of a forming position of the linear image. The deflected light beam is converged toward a scanned face by the image-forming optical system to form a light spot on this scanned face. The scanned face is optically scanned by this light spot.

The scanning image-forming lens system is constructed by two lens groups composed of first and second lenses sequentially arranged from a side of the rotary polygon mirror to a side of the scanned face and having toric faces.

The scanning image-forming lens system has a function for approximately providing a conjugate relation in geometrical optics between positions of the deflecting reflecting face and the scanned face with respect to a cross scan-corresponding direction. The scanning image-forming lens system has an fθ function with respect to the main scan-corresponding direction.

The first and second lenses are arranged such that the first and second lenses are respectively shifted from a reference optical axis by distances $\Delta_1$ and $\Delta_2$ in the main scan-corresponding direction. The distances $\Delta_1$ and $\Delta_2$, and focal lengths $f_1$ and $f_2$ of the first and second lenses with respect to the main scan-corresponding direction satisfy the following conditions:

$$0.0001 < |\Delta_1/f_1| < 0.005 \quad (I)$$

$$0.0072 < |\Delta_2/f_2| < 0.013 \quad (II)$$

In the above description, the main scan-corresponding direction is set to a direction corresponding to a main scanning direction in a virtual state in which an optical path from the light source to the scanned face is linearly developed. The cross scan-corresponding direction is set to a direction corresponding to a cross scanning direction in this virtual state.

The reference optical axis means an optical axis of the above deflected light beam in a state in which the optical axis of the deflected light beam provided by the rotary polygon mirror is parallel to optical axes of the first and second lenses parallel to each other.

An optical scanner in accordance with a second structure of the present invention has a light source device, a linear image-forming optical system, a rotary polygon mirror and an image-forming optical system.

The light source device emits a light beam.

The linear image-forming optical system focuses and forms the light beam from the light source device as a linear image extending in a main scan-corresponding direction. There is no special limit about the light beam emitted from the light source device. Accordingly, any light beam emitted from the light source device may be used if a linear image can be formed from this light beam by the linear image-forming optical system. However, the construction of the linear image-forming optical system is simplified when the emitted light beam is substantially set to a parallel light beam.

The rotary polygon mirror has a deflecting reflecting face in the vicinity of a forming position of the linear image and deflects a reflected light beam at an equal angular velocity.

The image-forming optical system converges the deflected light beam from the rotary polygon mirror to a scanned face so as to form a light spot on the scanned face. This image-forming optical system is constructed by the scanning image-forming lens system having the first structure of the present invention.

Each of the first and second lenses has a symmetrical shape with respect to its optical axis in each of the main and cross scan-corresponding directions. When each of the first and second lenses is shifted from a reference optical axis in the main scan-corresponding direction, an incident angle of a deflected light beam incident to each of the first and second lenses on a face scanned by the deflected light beam is asymmetrically set with respect to the optical axis of each of the first and second lenses. This face scanned by the deflected light beam is called a deflecting scanning face in the following description. When reference positions of the first and second lenses are set by shifting these lenses from the reference optical axis as mentioned above, it is possible to provide effects similar to those obtained by the rotation of a lens around an axis parallel to the cross scan-corresponding direction. Thus, field curvature of the scanning image-forming lens system is rotationally changed. In the present invention, the field curvature is corrected by utilizing this rotational change.

The above conditions (I) and (II) are conditions for preferably holding the field curvature of the scanning image-forming lens system. When each of the ratios $|\Delta_1/f_1|$ and $|\Delta_2/f_2|$ in the conditions (I) and (II) exceeds upper and lower limits thereof, no field curvature of the scanning image-forming lens system is preferably provided in each of the main and cross scan-corresponding directions.

FIG. 1a shows one example of an optical scanner to which the present invention is applied.

A light source device 1 is constructed by a semiconductor laser and a collimator lens and substantially emits a parallel light beam. This parallel light beam is converged by a cylindrical lens 2 in a cross scan-corresponding direction. The cylindrical lens 2 constitutes an optical system for focusing and forming the light beam as a linear image. The light beam is then focused and formed as a linear image LI extending in a main scan-corresponding direction on a deflecting reflecting face 3a of a rotary polygon mirror 3.

The light beam reflected on the deflecting reflecting face 3a is deflected at an equal angular velocity when the rotary polygon mirror 3 is rotated around its shaft 3A at an equal speed. The light beam is then converged and formed as a light spot on a scanned face 6 by the actions of a first lens 4 and a second lens 5 constituting a scanning image-forming lens system 7.

The deflected light beam is set to a parallel light beam with respect to the main scan-corresponding direction and is set to a light beam diverged from the linear image LI with respect to the cross scan-corresponding direction. The scanning image-forming lens system 7 focuses and forms such a deflected light beam as an image on the scanned face 6. Therefore, the scanning image-forming lens system 7 is constructed by anamorphic lenses having refracting powers different from each other in the main and cross scan-corresponding directions. Positions of the deflecting reflecting face 3a and the scanned face 6 are approximately set in a conjugate relation in geometrical optics with respect to the cross scan-corresponding direction. Thus, the inclination of a reflecting face in the rotary polygon mirror 3 is corrected by such an optical arrangement. Further, this scanning image-forming lens system 7 has an f$\theta$ function with respect to the main scan-corresponding direction. Accordingly, an optical scanning operation of the optical scanner is substantially performed at an equal speed.

Figure 1B:
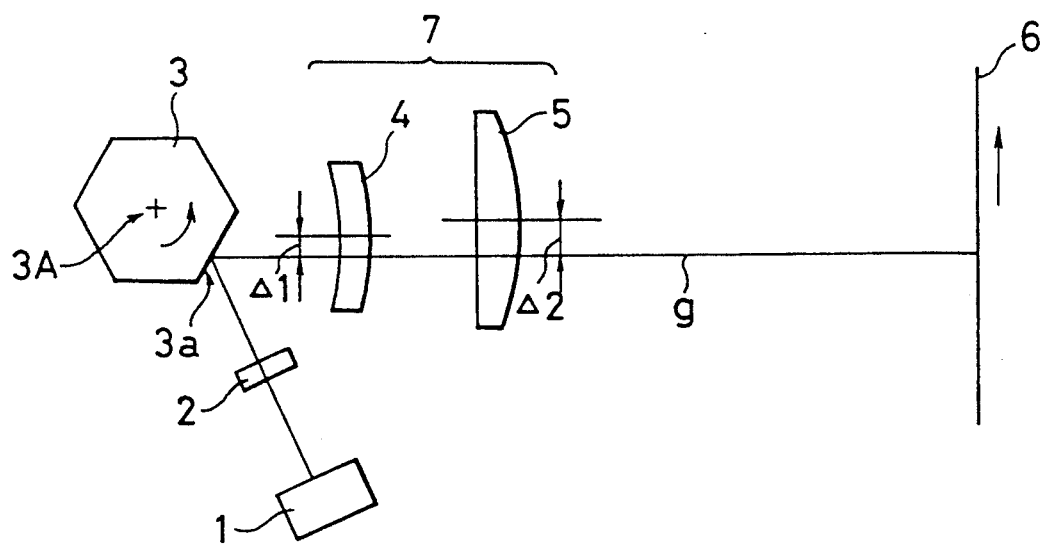
FIG. 1b is a view of the optical scanner shown in FIG. 1a and seen from a cross scan-corresponding direction.

FIG. 1b shows an optical arrangement of the above optical scanner seen from the cross scan-corresponding direction. The first lens 4 and the second lens 5 are arranged such that optical axes of the first lens 4 and the second lens 5 are respectively shifted from a reference optical axis g by distances $\Delta_1$ and $\Delta_2$ in the main scan-corresponding direction.

Five concrete Embodiments 1 to 5 of the present invention will next be described.

In the respective Embodiments, reference numerals $r_{xi}$ and $r_{yi}$ (i=1 to 4) respectively designate radii of curvature of an i-th lens face counted from a side of the rotary polygon mirror 3 with respect to the main and cross scan-corresponding directions. Reference numeral $d_i$ (i=0 to 3) designates a distance on the optical axis between the i-th lens face and an (i+1)-th lens face with the deflecting reflecting face as a zeroth lens face. Reference numeral $n_j$ (j=1, 2) designates a refractive index of a j-th lens counted from the side of the rotary polygon mirror 3. Combined focal lengths of the scanning image-forming lens system are respectively set to $f_M$ and $f_S$ in the main and cross scan-corresponding directions. The combined focal length $f_M$ is normalized to 100. Further, reference numerals $\beta$ and $\theta_0$ respectively designate an image forming magnification in the cross scan-corresponding direction and an angle of deflection. Reference numeral $\alpha$ designates an angle formed between the reference optical axis and the optical axis of a light beam incident to the rotary polygon mirror 3.

Embodiment 1

$f_M = 100$, $f_S = 30.906$, $\beta = -2.47$, $\alpha = 70°$, $2\theta_0 = 65°$,
$|\Delta_1/f_1| = 0.0006$, $|\Delta_2/f_2| = 0.0108$

| i | $r_{xi}$ | $r_{yi}$ | $d_i$ | j | $n_j$ |
|---|---|---|---|---|---|
| 0 | | | 20.098 | | |
| 1 | −30.129 | −30.129 | 7.395 | 1 | 1.51118 |
| 2 | −30.182 | −22.54 | 17.178 | | |
| 3 | ∞ | −75.496 | 5.688 | 2 | 1.82485 |
| 4 | −100.918 | −22.54. | | | |

Embodiment 2

$f_M = 100$, $f_S = 25.461$, $\beta = -2.54$, $\alpha = 70°$, $2\theta_0 = 65°$,
$|\Delta_1/f_1| = 0.0001$, $|\Delta_2/f_2| = 0.0072$

| i | $r_{xi}$ | $r_{yi}$ | $d_i$ | j | $n_j$ |
|---|---|---|---|---|---|
| 0 | | | 9.107 | | |
| 1 | −25.729 | −25.729 | 4.743 | 1 | 1.57210 |
| 2 | −27.199 | ∞ | 17.834 | | |
| 3 | ∞ | −44.091 | 7.589 | 2 | 1.57210 |
| 4 | −62.076 | −11.816. | | | |

Embodiment 3

$f_M = 100$, $f_S = 21.519$, $\beta = -3.78$, $\alpha = 70°$, $2\theta_0 = 64.9°$,
$|\Delta_1/f_1| = 0.0004$, $|\Delta_2/f_2| = 0.0085$

| i | $r_{xi}$ | $r_{yi}$ | $d_i$ | j | $n_j$ |
|---|---|---|---|---|---|
| 0 | | | 3.809 | | |
| 1 | ∞ | −119.603 | 1.905 | 1 | 1.57210 |
| 2 | 163.234 | 163.234 | 18.169 | | |
| 3 | ∞ | −37.709 | 5.333 | 2 | 1.57210 |
| 4 | −45.564 | −9.846. | | | |

Embodiment 4

$f_M = 100$, $f_S = 20.476$, $\beta = -3.99$, $\alpha = 70°$, $2\theta_0 = 64.9°$,
$|\Delta_1/f_1| = 0.0022$, $|\Delta_2/f_2| = 0.0086$

| i | $r_{xi}$ | $r_{yi}$ | $d_i$ | j | $n_j$ |
|---|---|---|---|---|---|
| 0 | | | 3.61 | | |

-continued

| | | | | | |
|---|---|---|---|---|---|
| 1 | −113.466 | −113.466 | 3.8 | 1 | 1.57210 |
| 2 | ∞ | 38.148 | 15.008 | | |
| 3 | ∞ | −38.148 | 5.699 | 2 | 1.57210 |
| 4 | −42.07 | −9.41. | | | |

Embodiment 5

$f_M = 100$, $f_S = 22.155$, $\beta = -3.7$, $\alpha = 70°$, $2\theta_0 = 65°$,
$|\Delta_1/f_1| = 0.0049$, $|\Delta_2/f_2| = 0.0126$

| i | $r_{xi}$ | $r_{yi}$ | $d_i$ | j | $n_j$ |
|---|---|---|---|---|---|
| 0 | | | 8.926 | | |
| 1 | −109.254 | −109.254 | 4.698 | 1 | 1.74405 |
| 2 | ∞ | 57.736 | 9.686 | | |
| 3 | ∞ | −57.736 | 6.837 | 2 | 1.71221 |
| 4 | −47.257 | −12.05. | | | |

FIGS. 2 to 6 show field curvature, linearity and $f\theta$ characteristics of the scanning image-forming lens system with respect to the above Embodiments 1 to 5. In FIGS. 2a to 6a showing the field curvature, the position of an image formed in the main scan-corresponding direction is shown by a broken line and the position of an image formed in the cross scan-corresponding direction is shown by a solid line.

As is well known, the $f\theta$ characteristics are represented by a value defined as follows:

$$\{H_r(\theta)/H_i(\theta)-1\}\times 100\%$$

In this case, reference numeral $H_i(\theta)$ designates the height of an ideal image at the angle $\theta$ of deflection and reference numeral $H_r(\theta)$ designates a height of the real image.

Further, as is well known, the above linearity is represented by a value defined as follows:

$$\{dH_r(\theta)/dH_i(\theta)-1\}\times 100\%$$

Figure 7:
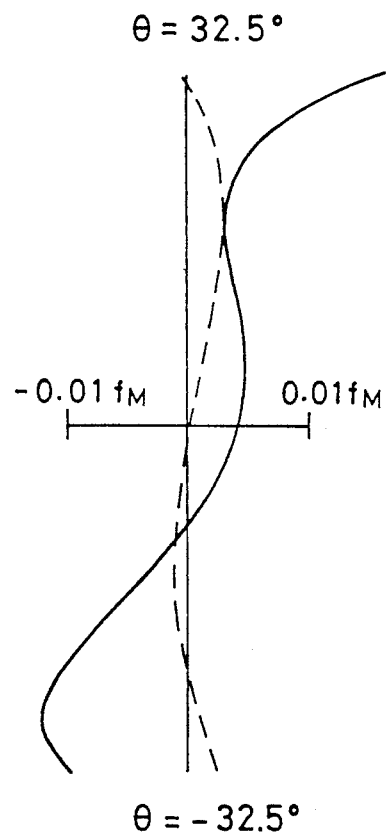
FIG. 7 is a diagram showing field curvature of the scanning image-forming lens system in Comparing example 1.

FIG. 7 shows field curvature for comparison in Comparing example 1. In this Comparing example 1, the first and second lenses of the scanning image-forming lens system in the Embodiment 1 are arranged such that these first and second lenses are shifted from the reference optical axis by the same distance $\Delta$. In the Comparing example 1, the field curvature of the scanning image-forming lens system is corrected in the main scan-corresponding direction in this arrangement of the first and second lenses. In this Comparing example 1, $|\Delta/f_1|=0.0006$ is formed.

Figure 8:
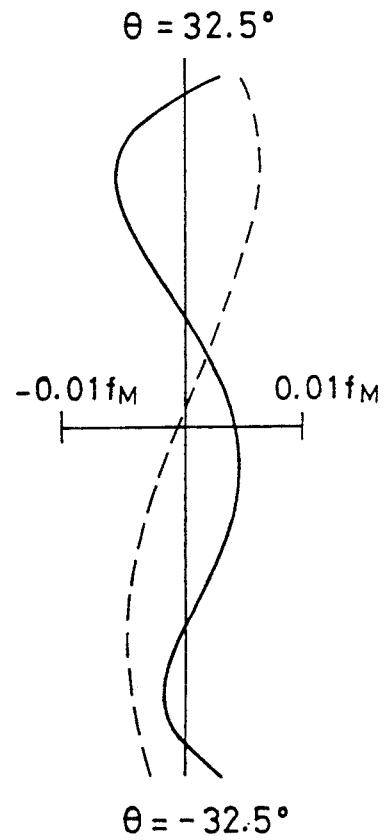
FIG. 8 is a diagram showing field curvature of the scanning image-forming lens system in Comparing example 2.

FIG. 8 shows field curvature in Comparing example 2. In this Comparing example 2, the first and second lenses of the scanning image-forming lens system in the Embodiment 1 are arranged such that these first and second lenses are shifted from the reference optical axis by the same distance $\Delta$. In the Comparing example 2, the field curvature of the scanning image-forming lens system is corrected in the cross scan-corresponding direction in this arrangement of the first and second lenses. In this Comparing example 2, $|\Delta/f_2|=0.0077$ is formed.

The following results are obtained when the field curvature in the Embodiment 1 shown in FIG. 2a is compared with that in each of the Comparing examples 1 and 2 shown in FIGS. 7 and 8. Namely, it should be immediately understood from this comparison that field curvature can be preferably corrected in the main and cross scan-corresponding directions by independently setting the distances $\Delta_1$ and $\Delta_2$ from the reference optical axis to the optical axes of the first and second lenses in accordance with the present invention in comparison with a case in which these distances are set to be equal to each other.

As mentioned above, in accordance with the above scanning image-forming lens system and the above optical scanner using this lens system in the present invention, it is possible to preferably correct field curvatures in main and cross scan-corresponding directions simultaneously and independently.

Many widely different embodiments of the present invention may be constructed without departing from the spirt and scope of the present invention. It should be understood that the present invention is not limited to the specific embodiments described in the specification, except as defined in the appended claims.

What is claimed is:

1. A scanning image-forming lens system used in an optical scanner in which a light beam emitted from a light source device is focused and formed as a linear image extending in a main scan-corresponding direction;

the light beam is deflected at an equal angular velocity by a rotary polygon mirror having a deflecting reflecting face in the vicinity of a forming position of the linear image;

the deflected light beam is converged toward a scanned face by an image-forming optical system to form a light spot on the scanned face; and said scanned face is optically scanned by this light spot;

said image-forming optical system being constructed by two lens groups composed of first and second lenses sequentially arranged from a side of the rotary polygon mirror to a side of the scanned face and having toric faces;

the image-forming lens system having a function for approximately providing a conjugate relation in geometrical optics between positions of said deflecting reflecting face and the scanned face with respect to a cross scan-corresponding direction, and an $f\theta$ function with respect to the main scan-corresponding direction;

said first and second lenses being arranged such that the first and second lenses are respectively shifted from a reference optical axis by distances $\Delta_1$ and $\Delta_2$ in the main scan-corresponding direction; and said distances $\Delta_1$ and $\Delta_2$, and focal lengths $f_1$ and $f_2$ of said first and second lenses with respect to the main scan-corresponding direction satisfying the following conditions, $$0.0001 < |\Delta_1/f_1| < 0.005 \quad (I)$$

$$0.0072 < |\Delta_2/f_2| < 0.013 \quad (II)$$

2. An optical scanner comprising:

a light source device;

a linear image-forming optical system for focusing and forming a light beam emitted from the light source device as a linear image extending in a main scan-corresponding direction;

a rotary polygon mirror having a deflecting reflecting face in the vicinity of a forming position of the linear image and deflecting a reflected light beam at an equal angular velocity; and an image-forming optical system for converging the deflected light beam from the rotary polygon mirror to a scanned face so as to form a light spot on the scanned face;

said image-forming optical system being constructed by a scanning image-forming lens system;

said scanning image-forming lens system being constructed by two lens groups composed of first and second lenses sequentially arranged from a side of the rotary polygon mirror to a side of the scanned face and having toric faces;

the scanning image-forming lens system having a function for approximately providing a conjugate relation in geometrical optics between positions of said deflecting reflecting face and the scanned face with respect to a cross scan-corresponding direction, and an f$\theta$ function with respect to the main scan-corresponding direction;

said first and second lenses being arranged such that the first and second lenses are respectively shifted from a reference optical axis by distances $\Delta_1$ and $\Delta_2$ in the main scan-corresponding direction; and said distances $\Delta_1$ and $\Delta_2$, and focal lengths $f_1$ and $f_2$ of said first and second lenses with respect to the main scan-corresponding direction satisfying the following conditions, $$0.0001 < |\Delta_1/f_1| < 0.005 \quad (I)$$

$$0.0072 < |\Delta_2/f_2| < 0.013 \quad (II).$$

* * * * *